United States Patent Office 3,476,783
Patented Nov. 4, 1969

3,476,783
6,6-ETHYLENE-9α-FLUORO STEROIDS
James F. Kerwin, Broomall, Pa., assignor to Smith Kline & French Laboratories, Philadelphia, Pa., a corporation of Pennsylvania
No Drawing. Filed Oct. 8, 1965, Ser. No. 494,239
Int. Cl. C07c *169/22, 169/10;* A61k *27/00*
U.S. Cl. 260—397.45                                      4 Claims

ABSTRACT OF THE DISCLOSURE

The invention relates to 6,6-ethylene-androst-4-ene-3-ones and estr-4-enes-3-ones oxygenated at the 11- and 17-position and fluorinated at the 9-position. The compounds are prepared by (1) formulation of a 3,5-diene; (2) reducing the resultant formyl group to a hydroxy methyl substituent; (3) dehydration the latter to form a 6-methylene compound and (4) reacting same with dimethyl sulfoxonium methylide to obtain the 6,6-ethylene derivatives. The final products are compounds which have anabolic activity.

---

This invention relates to 6,6-ethylene steroids having a high degree of hormonal activity. In particular, the invention relates to 6,6-ethylene androst-4-en-3-ones and estr-4-en-3-ones, oxygenated at the 11- and 17-positions, and fluorinated at the 9-position, having potent anabolic activity. The uniqueness of the compounds of the present invention lies in the combined presence of the 6,6-ethylene grouping, 11-oxygenation, and 9-fluoro group in the steroid molecule.

The compounds of the invention are thus represented by the following structural formula:

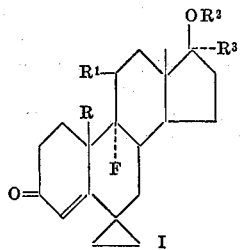

I where R is hydrogen or methyl; $R^1$ is hydroxy or keto; $R^2$ is hydrogen, acyl, 1-cyclopentenyl, or 2-tetrahydropyranyl; and $R^3$ is hydrogen or, when $R^2$ is hydrogen or acyl, $R^3$ can also be lower alkyl.

The invention also includes the $\Delta^{1,2}$ analogs of compounds of Formula I in which R is methyl.

For purposes of the present invention, the term "lower alkyl" refers to those alkyl groups having up to about five carbon atoms therein, including methyl, ethyl, and propyl. The term "acyl" refers to those hydrocarbon acyl groups having up to about 10 carbon atoms therein, including acetyl, propionyl, butyryl, valeryl, benzoyl, heptanoyl, 3-phenylpropionyl, tert-butylacetyl, and 3-cyclopentylpropionyl.

A preferred group of compounds is represented by Formula II, which embraces the androstenes included within the scope of Formula I.

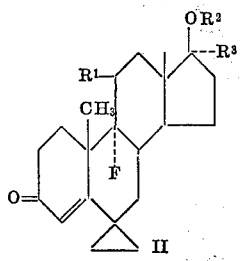

II

Particularly preferred compounds of the invention include 6,6-ethylene-9α-fluoro-11β,17β-dihydroxy-17α-methylandrost-4-en-3-one; 6,6-ethylene-9α-fluoro-11β,17β-dihydroxy-androst-4-en-3-one 2-tetrahydropyranyl ether; 6,6-ethylene-9α-fluoro-11β,17β-dihydroxyestr-4-en-3-one; and 6,6 - ethylene - 9α - fluoro - 11β,17β - dihydroxyestr - 4-en-3-one 2-tetrahydropyranyl ether.

The preparation of the androstenes included within the scope of Formula I, i.e. those compounds in which R is methyl, is illustrated below in Chart A for the preparation of a preferred compound of the invention, 6,6-ethylene - 9α - fluoro - 11β,17β - dihydroxy - 17α - methylandrost-4-en-3-one (III).

CHART A

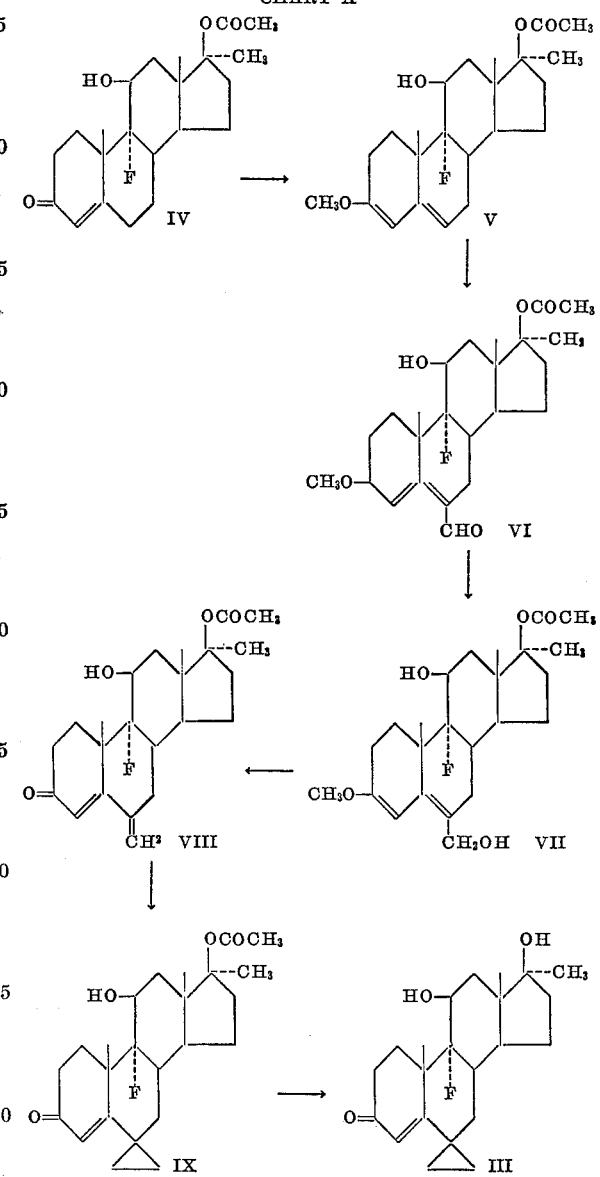

The 6-unsubstituted 9α-fluoro-11β,17β-dihydroxy-17α-methylandrost-4-en-3-one acetate (IV) (Brit. Patent 806,-045) is converted to an enol ether V by treatment with trimethyl orthoformate (or triethyl orthoformate) and an acid catalyst such as p-toluenesulfonic acid. The resulting 3-methoxy- (or ethoxy)-3,5-diene is formylated at the 6-position by treatment with the Vilsmeier reagent. This reagent, which consists of phosgene and dimethylformamide, reacts in an anhydrous medium with the diene at position 6 to give an iminium intermediate which is then hydrolyzed to the 6-formyl compound (VI). The formyl group is then reduced either catalytically or by means of lithium or sodium borohydride to give the 6-hydroxy-methyl compound (VII), and this group is dehydrated with a reagent such as glacial acetic acid, p-toluenesulfonic acid, or sulfuric acid to give the 6,6-ethylene compound (VIII). The 6,6-ethylene group is then created by means of a reagent capable of adding a methylene group across the 6-methylene double bond. A suitable reagent is dimethyl sulfoxonium methylide,

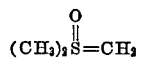

which is formed in situ by reaction of dimethyl sulfoxide methiodide with a strong base such as sodium hydride. The resulting 17-acetate (IX) is one of the preferred compounds of the invention. It is readily saponified to the 17-alcohol by means of an aqueous base such as sodium carbonate solution.

The $\Delta^{1,2}$ analogs of compounds in which R is methyl are prepared by treating the 1,2-saturated compound with a 1,2-dehydrogenating agent. The preferred reagent is 2,3-dichloro-5,6-dicyanobenzoquinone. It is also well known in the art to use microorganisms for this purpose.

Compounds of Formula I in which $R^3$ is lower alkyl other than methyl are prepared in the same manner as the 17α-methyl compound by starting with the appropriately 17α-alkyl substituted compounds, prepared as described in British Patent No. 806,045. Compounds in which $R^3$ is hydrogen are prepared as described above using the 17α-unsubstituted starting material described in U.S. 3,001,990. Compounds of Formula I in which $R^1$ is keto are prepared by oxidizing the corresponding compound in which $R^1$ is hydroxy with chromium trioxide, providing that $R^2$ and $R^3$ are not both hydrogen. If $R^2$ and $R^3$ are both hydrogen, the 17β-hydroxy group must be protected from oxidation by esterification.

Compounds in which $R^2$ is acyl are prepared by treating the 17-alcohol with an acyl halide or anhydride in the presence of a base such as pyridine according to well-known procedures. Alternatively, the acyl group may be present on the starting material.

The preparation of the estrenes included within the scope of Formula I, i.e. those compounds in which R is hydrogen, is illustrated below in Chart B for the preparation of 6,6-ethylene-9α-fluoro-11β,17β-dihydroxyester-4-en-3-one (X).

CHART B

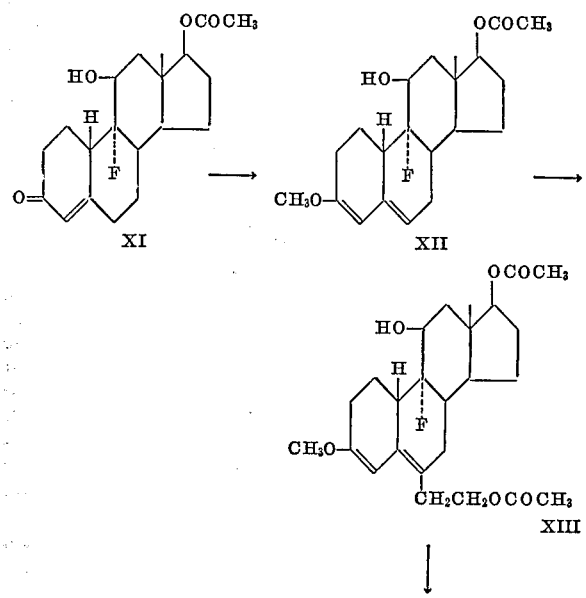

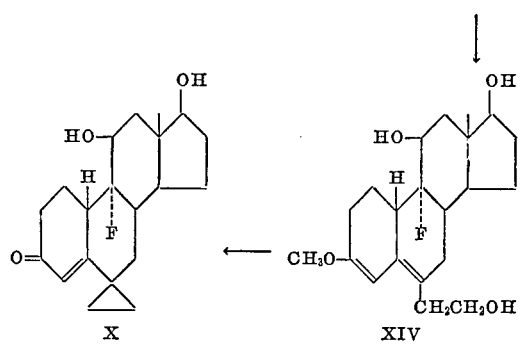

Compound XI is conventionally converted to the enol ether XII by treatment with trimethyl or triethyl orthoformate and p-toluenesulfonic acid. This diene is then condensed at 0–5° in an ether or halogenated hydrocarbon solvent with 2-acetoxyethyl mercuric acetate [J. Am. Chem. Soc. 81, 5316 (1959)] in the presence of a Lewis acid such as boron trifluoride etherate. The resulting 6-(2-acetoxyethyl) diene XIII is then hydrolyzed with a weak base such as sodium or potassium carbonate to give the 6-(2-hydroxyethyl) compound XIV. The 6-hydroxy group is then converted to a more reactive group such as the p-toluenesulfonate ester by reaction with a reagent such as p-toluenesulfonyl chloride in a base such as pyridine. Conversion to a halide, e.g. the chloride, is also suitable. This more reactive compound is then cyclized to X in pyridine containing a few percent of water.

Preparation of the 17-esters is accomplished by the usual acylation procedures described above. Oxidation of the 11-hydroxy group to an 11-keto group is performed by chromium trioxide. Preparation of compounds with 17α-alkyl groups other than methyl or without such a group is accomplishtd by using the correspondingly substituted or unsubstituted starting material.

Compounds of the invention in which $R^2$ is 1-cyclopentenyl or 2-tetrahydropyranyl are prepared by treating the 17-alcohol, unsubstituted at the 17α-position, with cyclopentanone diethyl ketal or with dihydropyran in the presence of an acid catalyst such as p-toluenesulfonic acid.

The compounds of the invention, having anabolic and androgenic activity, are useful in those instances in which it is desired to increase body weight and build muscle tissue and/or to stimulate the androgenic response. The principal compound of the invention, 6,6-ethylene-9α-fluoro-11β,17β-dihydroxy - 17α-methylandrost-4-en-3-one (III), has been found to exert a potent anabolic and androgenic effect when administered subcutaneously to rats at a dose of about 2.5–10 mg./kg. A solution of the compound in sesame oil is an effective vehicle for administration, although other standard formulations which can be prepared by a skilled pharmaceutical chemist may also be used.

The structures of the compounds described herein have been determined by means of such methods as elemental analysis and spectroscopic analysis, as well as from a knowledge of the starting materials and the nature of the reactions employed. However, it should be understood that the present invention consists of the actual chemical compounds prepared by the disclosed processes, whatever their structures.

The following examples are intended to illustrate the preparation of the compounds of the invention, but are not to be construed as limiting the scope thereof. Various obvious modifications in the compounds or in the processes for preparing them will occur to those skilled in the art of organic chemistry, and such modifications are to be considered part of the invention.

EXAMPLE 1

9α-fluoro-3-methoxy-17α-methylandrosta-3,5-diene-
11β,17β-diol 17-acetate

A suspension of 7.0 g. of 9α-fluoro-17α-methyl-11β, 17β-dihydroxyandrost-4-en-3-one 17-acetate in 15 ml. of dioxane is treated with 15 ml. of trimethyl orthoformate and 0.045 g. of p-toluenesulfonic acid. The agitated solution is maintained at 25° for 2.5 hours and is then diluted with methylene chloride containing a few drops of pyridine. The resulting solution is washed with dilute aqueous sodium bicarbonate solution, dried over sodium sulfate, and the solvent removed to give an oily residue. The oil is crystallized from aqueous methanol to yield the 3-methoxy-3,5-diene, M.P. 161–3°.

EXAMPLE 2

9α-fluoro-6-formyl-3-methoxy-17α-methylandrosta-3,5-
diene-11β,17β-diol 17-acetate A solution of 1.32 g. of dimethylformamide in 20 ml. of methylene chloride is slowly treated with 0.65 g. of phosgene in 30 ml. of methylene chloride. The stirred reaction mixture is maintained at 0° and a solution of 2.3 g. of the 3-methoxy-3,5-diene of Example 1 in 20 ml. of methylene chloride is added slowly. The reaction mixture is permitted to come to 25° and reaction to proceed at 25° for 3 hours. A solution of 9.0 g. of sodium acetate in 50 ml. of 30% aqueous methanol is added and the mixture vigorously agitated for 15 minutes. The organic layer is partitioned, dried over sodium sulfate and evaporated to a crystalline residue. The residue is recrystallized from methanol to yield the 6-formyl-3,5-diene, M.P. 245°.

EXAMPLE 3

9α-fluoro-6-hydroxymethyl-3-methoxy-17α-methyl-
androsta-3,5-diene-11β,17β-diol 17-acetate A suspension of 0.50 g. of the 6-formyl compound of Example 2 in 60 ml. of methanol is cooled and agitated during the addition of 0.09 g. of sodium borohydride in 10 ml. of water. Reaction is permitted to proceed at 25° for 30 minutes and the solution is then adjusted to pH 5.5 with acetic acid. Concentration of the solution gives a precipitate of the 6-hydroxymethyl-3,5-diene, M.P. 179–80°.

EXAMPLE 4

9α-fluoro-11β,17β-dihydroxy-6-methylene-17α-methyl-
androst-4-en-3-one 17-acetate A solution of 0.50 g. of the 6-hydroxymethyl-3,5-diene in 15 ml. of glacial acetic acid is heated at 90° for 1 hour. Removal of solvent in vacuo gives a crystalline solid which is dissolved in methylene chloride and washed with dilute aqueous sodium bicarbonate. Drying of the partitioned organic layer and removal of solvent gives the Δ⁴-3-ketone which is recrystallized from acetone-hexane solution, M.P. 194°.

EXAMPLE 5

6,6-ethylene-9α-fluoro-11β,17β-dihydroxy-17α-methyl-
androst-4-en-3-one 17-acetate A suspension of 4.40 g. of dimethyl sulfoxide methiodide in 80 ml. of dimethyl sulfoxide is agitated during the addition of 0.86 g. of 55.6% sodium hydride. The mixture is agitated for 20 minutes and a solution of 3.5 g. of the 6-methylene compound of Example 4 in 65 ml. of dimethyl sulfoxide is added slowly. The agitated solution is kept at 25° for 2 hours and then diluted with 800 ml. of 50% aqueous benzene. The partitioned organic phase is dried over sodium sulfate, and the solvent removed in vacuo. The residue is recrystallized from acetone-hexane solution to yield 6,6-ethylene-9α-fluoro-11β, 17β - dihydroxy - 17α - methylandrost - 4 - en - 3 - one 17-acetate, M.P. 212–213°.

EXAMPLE 6

6,6-ethylene-9α-fluoro-11β,17β-dihydroxy-17α-
methylandrost-4-en-3-one

A solution of 2.8 g. of the ester of Example 5 in 80 ml. of methanol is treated with 15 ml. of water and 2.0 g. of sodium carbonate. The suspension is agitated at gentle reflux temperature for 40 hours and then diluted with water. The precipitate is extracted with ethyl acetate. Drying and evaporation of the solvent gives a residue from which the title product, M.P. 260–261°, is obtained by crystallization from methanolic ethyl acetate solution; $\alpha_{25}{}^D = +245.0°$.

EXAMPLE 7

When 6.73 g. of 9α-fluoro-11β,17β-dihydroxyandrost-4-en-3-one 17-acetate is used as a starting material and is converted to the enol ether, formylated, reduced, dehydrated, and treated with dimethyl sulfoxonium methylide, as described in Examples 1–5, 6,6-ethylene-9α-fluoro-11β, 17β-dihydroxyandrost-4-en-3-one 17-acetate is obtained. Hydrolysis as in Example 6 gives 6,6-ethylene-9α-fluoro-11β,17β-dihydroxyandrost-4-en-3-one.

When 7.29 g. of 9α-fluoro-11β,17β-dihydroxy-17α-ethyl-androst-4-en-3-one 17 acetate is used as the starting material and the same series of reactions is performed, 6,6-ethylene-9α - fluoro-11β,17β-dihydroxy-17α-ethylandrost-4-en-3-one 17-acetate is obtained. Hydrolysis gives the corresponding 17-alcohol.

EXAMPLE 8

To a solution of 1 g. of 6,6-ethylene-9α-fluoro-11β, 17β-dihydroxyandrost-4-en-3-one in 100 ml. of anhydrous pyridine is added 6 ml. of propionic anhydride. The reaction mixture is allowed to stand overnight at room temperature and then poured into ice water. The resulting precipitate is filtered off and recrystallized to give 6,6-ethylene-9α - fluoro-11β,17β-dihydroxyandrost-4-en-3-one 17-propionate.

Use of an equivalent amount of butyryl chloride, 3-phenylpropionyl chloride, or 3-cyclopentylpropionyl chloride gives the corresponding butyryl, 3-phenylpropionyl, or 3-cyclopentylpropionyl ester.

EXAMPLE 9

A mixture of 5.48 g. of 6,6-ethylene-9α-fluoro-11β,17β-dihydroxyandrost-4-en-3-one and 10 ml. of cyclopentanone diethyl ketal is placed in a flask with a water trap and heated at 150–175° (bath temperature) until no more distillation occurs. The residue is cooled and diluted with aqueous methanol containing a few drops of pyridine. The mixture is then cooled to give 6,6-ethylene-9α-fluoro-11β,17β - dihydroxyandrost-4-en-3-one, 17-cyclopenten-1-yl ether.

EXAMPLE 10

A mixture of 1 g. of 6,6-ethylene-9α-fluoro-11β,17β-dihydroxyandrost-4-en-3-one, an excess of dihydropyran, and a catalytic amount of p-toluenesulfonic acid in benzene is refluxed for a short period of time. Evaporation of the solvent in vacuo gives 6,6-ethylene-9α-fluoro-11β, 17β - dihydroxyandrost - 4 - en - 3 - one 17 - tetrahydropyran-2-yl ether.

EXAMPLE 11

A solution of 1.79 g. of 6,6-ethylene-9α-fluoro-17α-methyl-11β,17β-dihydroxyandrost-4-en-3-one and 1.5 g. of 2,3-dichloro-5,6-dicyanobenzoquinone in 50 ml. of dioxane is refluxed for ca. 18 hours. The solution is filtered, the filtrate evaporated to dryness, and the residue taken up in ethyl acetate. The solution is washed with water and then dried and evaporated to give 6,6-ethylene - 9α - fluoro - 17α - methyl - 11β,17β - dihydroxyandrosta-1,4-dien-3-one.

EXAMPLE 12

A solution of 54.3 g. of 9α-fluoro-11β,17β-dihydroxyestr-4-en-3-one 17-acetate in 65 ml. of dioxane and 50 ml. of trimethyl orthoformate is treated with 0.25 g. of p-toluenesulfonic acid with stirring. After 8 hours the reaction mixture is quenched with pyridine, cooled and diluted with water. The product is collected by filtration and recrystallized to give 3-methoxy-9α-fluoroestra-3,5-diene-11β,17β-diol 17-acetate.

To a stirred solution of 3.64 g. of the diene and 5.2 g of 2-acetoxyethyl mercuric acetate [J. Am. Chem. Soc. 81, 5316 (1959)] in ca. 20 ml. of methylene chloride is added 0.3 ml. of boron trifluoride etherate. The addition is carried out dropwise under nitrogen at 0°. The mixture is maintained at 0° with stirring for 3 hours, quenched with 2 ml. of pyridine, diluted with methylene chloride, decanted from precipitated mercury, washed with dilute sodium carbonate solution, dried, and evaporated to a residue. The residue is dissolved in benzene-petroleum ether (1:2) and filtered through a column of 60 g. of activity III Woelm alumina. The column is washed with 200 ml. of the same solvent mixture and the total filtrate is evaporated to yield 3-methoxy-6-(2-acetoxyethyl)-9α-fluoroestra-3,5-diene-11β,17β-diol 17-acetate.

A solution of 0.5 g. of the diacetate in 15 ml. of alcohol is refluxed with 5 ml. of aqueous sodium carbonate for 45 minutes. The cooled reaction mixture is diluted with water and extracted with methylene chloride. The methylene chloride extracts are dried and evaporated to a residue which is crystallized to give 3-methoxy-6-(2-hydroxyethyl)-9α-fluoroestra-3,5-diene-11β,17β-diol.

A solution of 0.10 g. of the hydroxyethyl compound in 1 ml. of pyridine is treated with 0.09 g. of p-toluenesulfonyl chloride at 0°. After 1.5 hours at 0°, the reaction mixture is warmed to 27° for 0.5 hours, treated with 3 drops of water, and allowed to stand for 16 hours. The reaction mixture is diluted with water and extracted with methylene chloride. After washing the methylene chloride extracts with cold, dilute phosphoric acid, they are dried and evaporated. The residue is dissolved in benzene-petroleum ether (1:2) and chromatographed on 4 g. of activity III Woelm alumina. Elution with benzene and benzene-methylene chloride (3:1) gives 6,6-ethylene-9α-fluoro-11β,17β-dihydroxyestr-4-en-3-one.

Treatment of 1 g. of this compound with an excess of dihydropyran and a catalytic amount of p-toluenesulfonic acid as in Example 10 gives 6,6-ethylene-9α-fluoro-11β, 17β - dihydroxyestr - 4 - en - 3 - one 17 - tetrahydropyran-2-yl ether.

EXAMPLE 13

To a solution of 4.82 g. of 6,6-ethylene-9α-fluoro-11β, 17β-dihydroxyandrost-4-en-3-one 17-acetate in a mixture of 75 ml. of acetone and 25 ml. of chloroform is added 6.8 ml. of standard chromic acid (26.72 g. of chromium trioxide, 23 ml. of sulfuric acid, water to 100 ml.). The addition is carried out over a one-minute period while the reaction mixture is stirred and maintained at 0°. Stirring is continued for a few minutes after the addition is complete. The reaction mixture is then poured into cold water and the mixture is then extracted with methylene chloride. Evaporation of the dried extracts, followed by crystallization of the residue gives 6,6-ethylene-9α-fluoro-17β-hydroxyandrost-4-ene-3,11-dione 17 - acetate. Hydrolysis as in Example 6 with aqueous sodium carbonate gives the 17-alcohol.

I claim:
1. 9α-fluoro-11β,17β-dihydroxy-6-methylene-17α-methylandrost-4-en-3-one 17-acetate.
2. 9α-fluoro-6-hydroxymethyl-3-methoxy-17α-methylandrosta-3,5-diene-11β,17β-diol 17-acetate.
3. 9α-fluoro-6-formyl-3-methoxy-17α-methylandrosta-3,5-diene-11β,17β-diol 17-acetate.
4. 9α-fluoro-3-methoxy-17α-methylandrosta-3,5-diene-11β,17β-diol 17-acetate.

References Cited
UNITED STATES PATENTS

| | | | |
|---|---|---|---|
| 3,354,151 | 11/1967 | Muller et al. | 260—239.55 |
| 3,371,087 | 2/1968 | Beard | 260—239.55 |
| 3,383,393 | 5/1968 | De Jongh | 260—397.5 |

ELBERT L. ROBERTS, Primary Examiner

U.S. Cl. X.R.

260—239.55, 397.5, 999